W. G. COX.
AUTOMOBILE BUMPER.
APPLICATION FILED MAY 20, 1921.
1,387,767.
Patented Aug. 16, 1921.
2 SHEETS—SHEET 1.
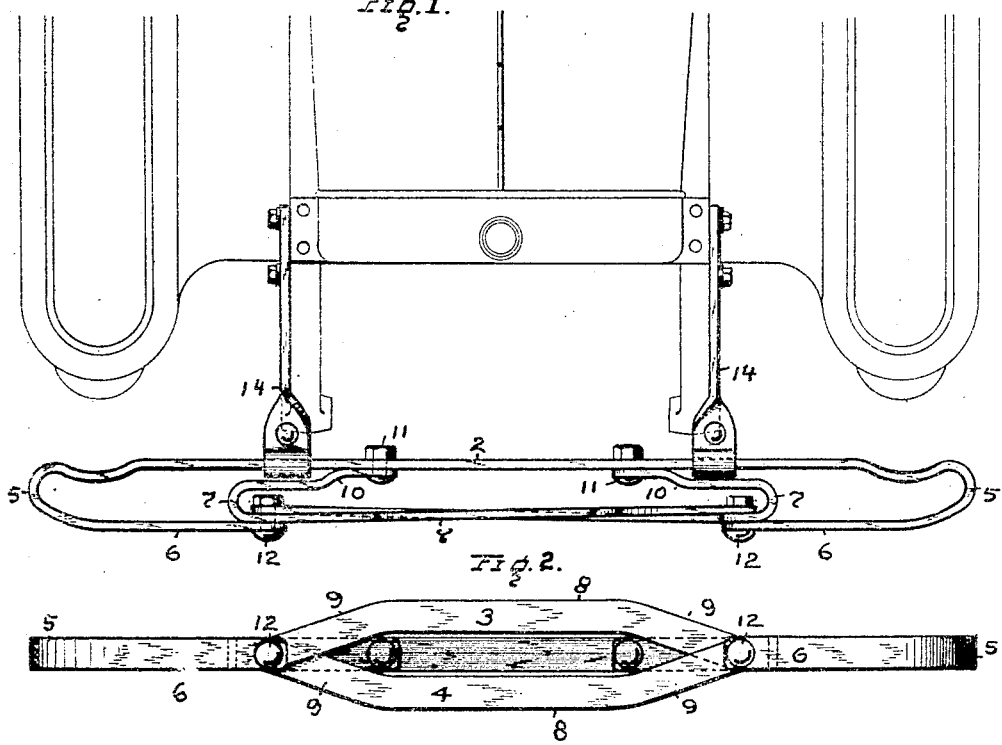
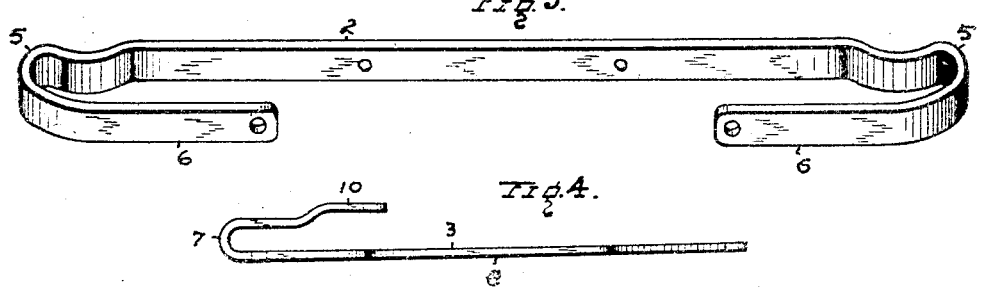
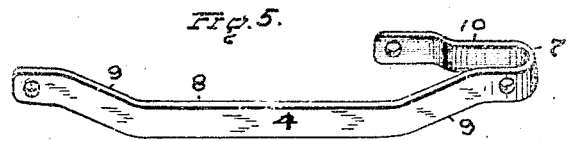
Inventor
W. G. Cox
By Fisher &co
Attorneys

W. G. COX.
AUTOMOBILE BUMPER.
APPLICATION FILED MAY 20, 1921.

1,387,767.

Patented Aug. 16, 1921.
2 SHEETS—SHEET 2.

Inventor
W. G. Cox

By [signature]
Attorneys

UNITED STATES PATENT OFFICE.

WILLIAM G. COX, OF CLEVELAND, OHIO, ASSIGNOR TO COX BRASS MANUFACTURING COMPANY, OF ALBANY, NEW YORK, A CORPORATION OF NEW YORK.

AUTOMOBILE-BUMPER.

1,387,767.     Specification of Letters Patent.     Patented Aug. 16, 1921.

Application filed May 20, 1921. Serial No. 471,163.

*To all whom it may concern:*

Be it known that I, WILLIAM G. COX, a citizen of the United States, residing at Cleveland, in the county of Cuyahoga and State of Ohio, have invented certain new and useful Improvements in Automobile-Bumpers, of which the following is a specification.

The present invention consists of a resilient bumper made of spring bars which are constructed and assembled in a particular way to provide a relatively wide impact face and shock-absorbing loops immediately behind said face between the opposite ends of the bumper. More specifically stated, the purpose is to provide an exceptionally strong and wide-faced bumper composed of three bars joined together with spring loops at the middle and the ends of the bumper, whereby all shocks will be uniformly distributed to and absorbed by all the bars of the bumper.

Figure 6:
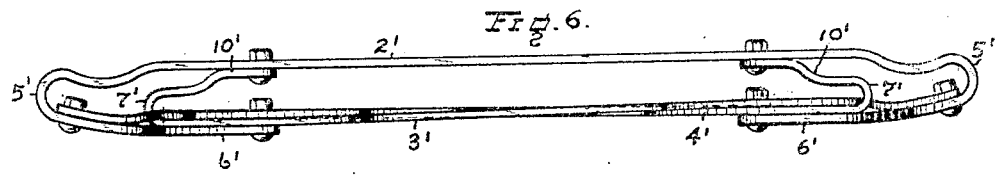
Figure 7:
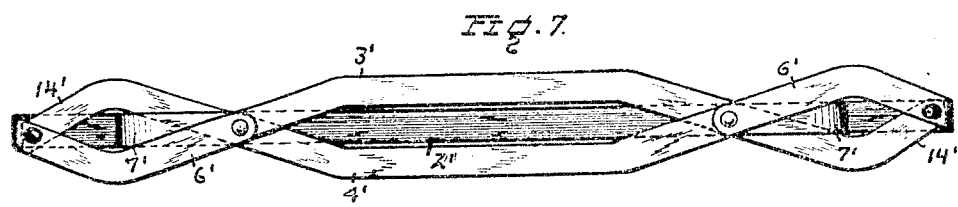
Figure 8:
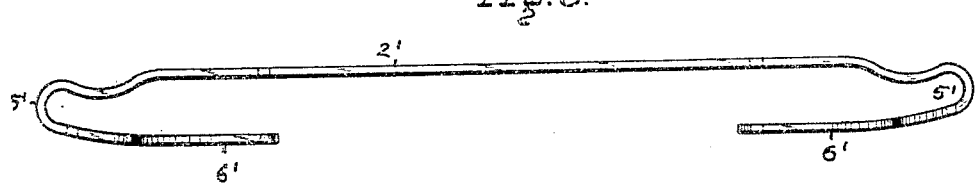
Figure 9:
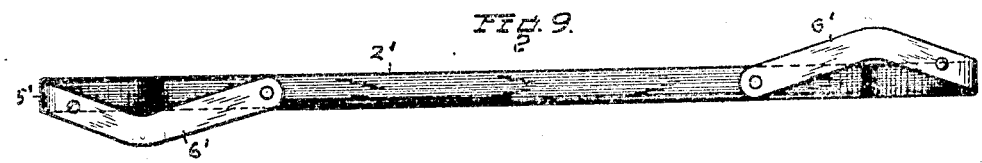
Figure 10:
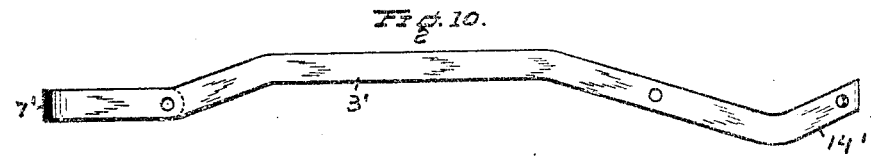
Figure 11:
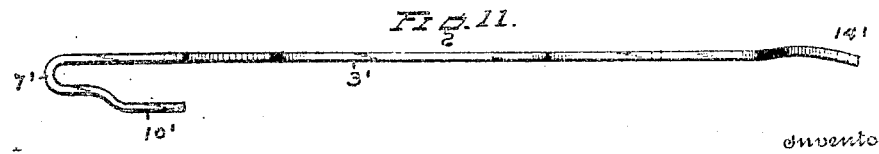

In the drawings accompanying this application, Figure 1 is a plan view of a bumper embodying my invention affixed to the frame of an automobile. Fig. 2 is a front view of the same bumper, and Fig. 3 is a perspective view of the rear bar by itself. Figs. 4 and 5 are edge and perspective views respectively of an impact bar. Figs. 6 to 11, illustrate a modified form of the invention, Figs. 6 and 7 showing top and front views, respectively, of the complete bumper, and Figs. 8 and 9 showing edge and front views of the rear bar. Figs. 10 and 11 are front and edge views of one of the impact bars.

Referring first to Figs 1 to 5, inclusive, the bumper shown therein comprises three bars 2, 3 and 4, respectively, the main or rear bar 2 being straight for its major length and curved forwardly at its opposite ends and thence toward the middle of the bar to provide rounded spring loops 5—5 and short straight spring extensions 6—6 in front of the bar. Bars 3 and 4 serve as impact members and are identical in form and construction but by a reverse placement these two bars may be united with the main bar 2 to present a broadened impact face at the front side thereof and also provide two reënforcing spring loops 7—7 at spaced intervals intermediate the end loops 5—5 and transversely between the spring extensions 6 and the middle flexible portion of the rear bar. To that end each bar 3 and 4 comprises a long impact arm 8 having diverging portions 9—9, one of which is curved rearwardly at two places and extends as a short arm 10 toward the opposite end of and parallel with the long arm 8 so that the extermity of each short arm 10 may be united by a rivet or bolt 11 to the main rear bar 2 and the extermity of each long arm 8 may be fastened by a rivet or bolt 12 to spring extension 6 of bar 2 and to loop 7 of the companion impact member. All three bars are thus firmly united together at their extremities by four bolts or rivets, and the spring arms or loops of the impact members sustain them in an upright position under shocks and blows and also reinforce the main bar and its spring extensions while absorbing the shocks coöperatively with said main bar. Briefly stated, the impact is transmitted through the four spring loops to the rear bar and the three bars sustain the shock concurrently and equally.

The means for supporting the bumper upon the vehicle comprises adjustable brackets 14 substantially as shown, but any other mode of securing the bumper to the vehicle may be employed.

The invention as exemplified in Figs. 6 to 11, inclusive, also comprises a three piece bumper having supplemental spring loops between the opposite looped ends of the bumper. Thus, a main bar 2' having spring loops 5' and spring extensions 6' at opposite ends thereof, is united with two companion impact bars 3' and 4' having spring loops 7' and short arms 10' in substantially the same manner as in the bumper hereinbefore described. However, there is this difference,—the main bar extensions 6' are bent on obtuse angular lines upwardly and downwardly at opposite ends of the bar, and the impact bars extend the full length of the bumper and have angular extremities 14' also bent on obtuse angular lines. By placing and uniting the angular ends of the impact bars in crossed relation to the angular ends of the main bars the bumper is provided with broad impact ends adapted to fully protect the fenders and wheels of the vehicle to which the bumper is attached.

What I claim is:

1. A vehicle bumper, comprising a main bar of metal bent reversely at its opposite ends, and a supplemental bar affixed to said reversely bent ends having a spring portion engaged with said main bar between its ends.

2. A resilient bumper, comprising a main bar and a pair of complementary bars having spring loops engaged with said main bar intermediate its ends.

3. A bumper for automobiles, comprising a main bar having reversely bent extremities and a pair of complementary bars affixed at their opposite ends to said main bar and bent to provide spring loops intermediate the ends of said main bar.

4. A bumper made of a plural number of metal bars, each having a reversely bent portion adapted to provide spring loops, said bars being assembled with the loop of one bar interengaged with the reversely bent portion of another bar.

5. A bumper, comprising a pair of impact bars bent reversely at their respective ends and angularly to higher and lower planes between their ends, and a supporting bar connected with the reversely-bent ends of said impact bar.

6. A bumper, comprising a main supporting bar and an impact bar bent on angular lines to lie in higher and lower planes having a curved spring extremity connected with said main bar.

7. A bumper, comprising a main bar having curved spring extremities, and a pair of impact bars bent on angular lines to place impact portions thereof on different horizontal planes having reversely bent portions connected with said main bar between and with its extremities.

8. A bumper, comprising a plural number of bars having angularly-bent extremities adapted to provide double impact faces at opposite ends thereof.

9. A bumper, comprising a main bar having reversely bent extremities of angular formation, and a pair of complementary impact bars bent reversely and angularly at their opposite extremities and united at their ends to said main bar.

WILLIAM G. COX.